(12) United States Patent
Rossignoli

(10) Patent No.: US 7,711,176 B2
(45) Date of Patent: May 4, 2010

(54) COMPUTER-IMPLEMENTED METHOD OF PROCESSING A SUBSTITUTE CHECK AND AN APPARATUS THEREFOR

(75) Inventor: James M. Rossignoli, Cambridge (CA)

(73) Assignee: NCR Corporation, Dayton, OH (US)

( * ) Notice: Subject to any disclaimer, the term of this patent is extended or adjusted under 35 U.S.C. 154(b) by 996 days.

(21) Appl. No.: 11/305,758

(22) Filed: Dec. 16, 2005

(65) Prior Publication Data

US 2007/0140545 A1     Jun. 21, 2007

(51) Int. Cl.
  G06K 9/18   (2006.01)
  G06K 9/20   (2006.01)
  G06Q 40/00  (2006.01)
  G07D 11/00  (2006.01)
  G07F 19/00  (2006.01)

(52) U.S. Cl. .................. 382/140; 382/112; 382/182; 382/320; 382/321; 235/379; 235/449; 235/454; 705/45

(58) Field of Classification Search ................. 382/112, 382/135, 137–140, 182, 20; 705/45; 235/379, 235/449, 454

See application file for complete search history.

(56) References Cited

U.S. PATENT DOCUMENTS

| | | | |
|---|---|---|---|
| 3,764,978 A * | 10/1973 | Tyburski et al. ............. | 382/318 |
| 4,315,246 A * | 2/1982 | Milford ...................... | 382/140 |
| 5,235,652 A * | 8/1993 | Nally ......................... | 382/112 |
| 5,347,302 A * | 9/1994 | Simonoff .................... | 347/139 |
| 5,805,747 A * | 9/1998 | Bradford .................... | 382/310 |
| 6,195,453 B1 * | 2/2001 | Simonoff .................... | 382/137 |
| 6,282,308 B1 * | 8/2001 | Cossette ..................... | 382/137 |
| 6,739,510 B2 * | 5/2004 | Fitzgibbons et al. ... | 235/462.01 |
| 6,863,214 B2 * | 3/2005 | Garner et al. ............... | 235/379 |
| 7,028,886 B1 * | 4/2006 | Maloney ..................... | 235/375 |
| 7,066,668 B2 * | 6/2006 | Sandison et al. ............ | 400/578 |
| 7,066,669 B2 * | 6/2006 | Lugg .......................... | 400/578 |
| 7,113,925 B2 * | 9/2006 | Waserstein et al. ........... | 705/50 |
| 7,165,723 B2 * | 1/2007 | McGlamery et al. ........ | 235/449 |
| 7,167,580 B2 * | 1/2007 | Klein et al. ................. | 382/112 |
| 7,219,831 B2 * | 5/2007 | Murata ....................... | 235/379 |
| 7,231,068 B2 * | 6/2007 | Tibor ......................... | 382/116 |
| 7,376,258 B2 * | 5/2008 | Klein et al. ................. | 382/137 |
| 7,386,511 B2 * | 6/2008 | Buchanan et al. ............ | 705/45 |
| 7,433,098 B2 * | 10/2008 | Klein et al. ................. | 358/505 |
| 7,522,760 B1 * | 4/2009 | Will et al. ................... | 382/137 |
| 7,548,641 B2 * | 6/2009 | Gilson et al. ................ | 382/137 |
| 2004/0236688 A1 * | 11/2004 | Bozeman ..................... | 705/42 |

(Continued)

OTHER PUBLICATIONS

Specification for an Image Replacement Document—IRD, Aug. 2004, American National Standards Institute, X9.100-140-2004.*

(Continued)

Primary Examiner—Brian P Werner
Assistant Examiner—Anthony Mackowey
(74) Attorney, Agent, or Firm—Michael Chan

(57) ABSTRACT

A computer-implemented method is provided of processing a substitute check which has been made from an original check. The computer-implemented method comprises (a) reading from the substitute check a printed magnetic ink character recognition (MICR) codeline, (b) reading from the substitute check an imaged MICR codeline, and (c) comparing the printed MICR codeline of step (a) and the imaged MICR codeline of step (b) to determine if the printed MICR codeline and the imaged MICR codeline match.

11 Claims, 8 Drawing Sheets

U.S. PATENT DOCUMENTS

| | | | |
|---|---|---|---|
| 2005/0018896 A1* | 1/2005 | Heit et al. | 382/137 |
| 2005/0033685 A1* | 2/2005 | Reyes | 705/39 |
| 2005/0071283 A1* | 3/2005 | Randle et al. | 705/75 |
| 2005/0097037 A1* | 5/2005 | Tibor | 705/39 |
| 2005/0109833 A1* | 5/2005 | Page | 235/379 |
| 2005/0144189 A1* | 6/2005 | Edwards et al. | 707/102 |
| 2005/0171899 A1* | 8/2005 | Dunn et al. | 705/39 |
| 2005/0207635 A1* | 9/2005 | Lazar et al. | 382/139 |
| 2005/0243378 A1* | 11/2005 | Klein et al. | 358/3.27 |
| 2005/0281448 A1* | 12/2005 | Lugg | 382/139 |
| 2006/0022034 A1* | 2/2006 | Barkan et al. | 235/380 |
| 2006/0023930 A1* | 2/2006 | Patel et al. | 382/137 |
| 2006/0045321 A1* | 3/2006 | Yu | 382/137 |
| 2006/0080245 A1* | 4/2006 | Bahl et al. | 705/40 |
| 2006/0104498 A1* | 5/2006 | Kruppa et al. | 382/139 |
| 2006/0106717 A1* | 5/2006 | Randle et al. | 705/45 |
| 2006/0112013 A1* | 5/2006 | Maloney | 705/45 |
| 2006/0184441 A1* | 8/2006 | Haschka et al. | 705/35 |
| 2006/0191998 A1* | 8/2006 | Mueller et al. | 235/379 |
| 2006/0202468 A1* | 9/2006 | Phillips et al. | 283/72 |
| 2006/0208059 A1* | 9/2006 | Cable et al. | 235/379 |
| 2006/0212391 A1* | 9/2006 | Norman et al. | 705/40 |
| 2006/0229987 A1* | 10/2006 | Leekley | 705/45 |
| 2006/0237526 A1* | 10/2006 | Mueller et al. | 235/379 |
| 2006/0242062 A1* | 10/2006 | Peterson et al. | 705/42 |
| 2007/0019855 A1* | 1/2007 | Marlett et al. | 382/139 |
| 2007/0122024 A1* | 5/2007 | Haas et al. | 382/137 |
| 2007/0127782 A1* | 6/2007 | McMonagle et al. | 382/112 |
| 2007/0130063 A1* | 6/2007 | Jindia et al. | 705/39 |
| 2007/0175977 A1* | 8/2007 | Bauer et al. | 235/379 |

OTHER PUBLICATIONS

Operational/Implementation Issues, Jan. 2005, ECCHO, pp. 1-19 obtained from the ECCHO website http://www.eccho.org/pdf/Check21_Operational.pdf.*

* cited by examiner

COMPUTER-IMPLEMENTED METHOD OF PROCESSING A SUBSTITUTE CHECK AND AN APPARATUS THEREFOR

BACKGROUND

The present invention relates to substitute checks, and is particularly directed to a computer-implemented method of processing a substitute check and an apparatus therefor.

In a check truncation environment, an original check is not transferred between banks during the check clearing process. Instead, electronic image data which is representative of an image of an original check is transferred between the banks. When a paper version of the original check is needed, it may be printed on demand using the electronic image and related data which is representative of the original check. This paper version is called a substitute check. A substitute check is also referred to as an image replacement document (IRD).

The creation of substitute check for use in a check truncation environment is defined by American National Standards Institute (ANSI) X9.90 standard. This standard defines the content of a substitute check using the front and back images of an original check and data associated with the check. More specifically, a substitute check contains an image of the front and back of an original check. The substitute check also contains a magnetic ink character recognition (MICR) codeline that has all the information appearing on the MICR codeline of the original check at the time the original check was issued and any additional information that was encoded on the MICR codeline of the original check before an image of the original check was captured.

From time to time, it is conceivable that the MICR codeline of the substitute check may contain inaccurate information relative to the MICR codeline which appears in the check image on the substitute check. If this were to occur, a number of potential liabilities could arise. For example, a potential liability is that a bank may become legally liable for transfers of funds of a wrong amount or from a wrong customer. It would be desirable to avoid or at least minimize potential liabilities associated with inaccurate information between the MICR codeline of a substitute check and the MICR codeline which appears in the check image of the substitute check.

SUMMARY

In accordance with one aspect of the present invention, a computer-implemented method is provided of processing a substitute check which has been made from an original check. The computer-implemented method comprises (a) reading from the substitute check a printed magnetic ink character recognition (MICR) codeline, (b) reading from the substitute check an imaged MICR codeline, and (c) comparing the printed MICR codeline of step (a) and the imaged MICR codeline of step (b) to determine if the printed MICR codeline and the imaged MICR codeline match.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION

The present invention is directed to a computer-implemented method of processing a substitute check and an apparatus therefore. The specific environment in which the substitute check is used may vary. In the present application, the substitute check is used in a check truncation environment. The American National Standards Institute (ANSI) X9.90 standard defines the content of substitute checks in a check truncation environment.

Figure 1:
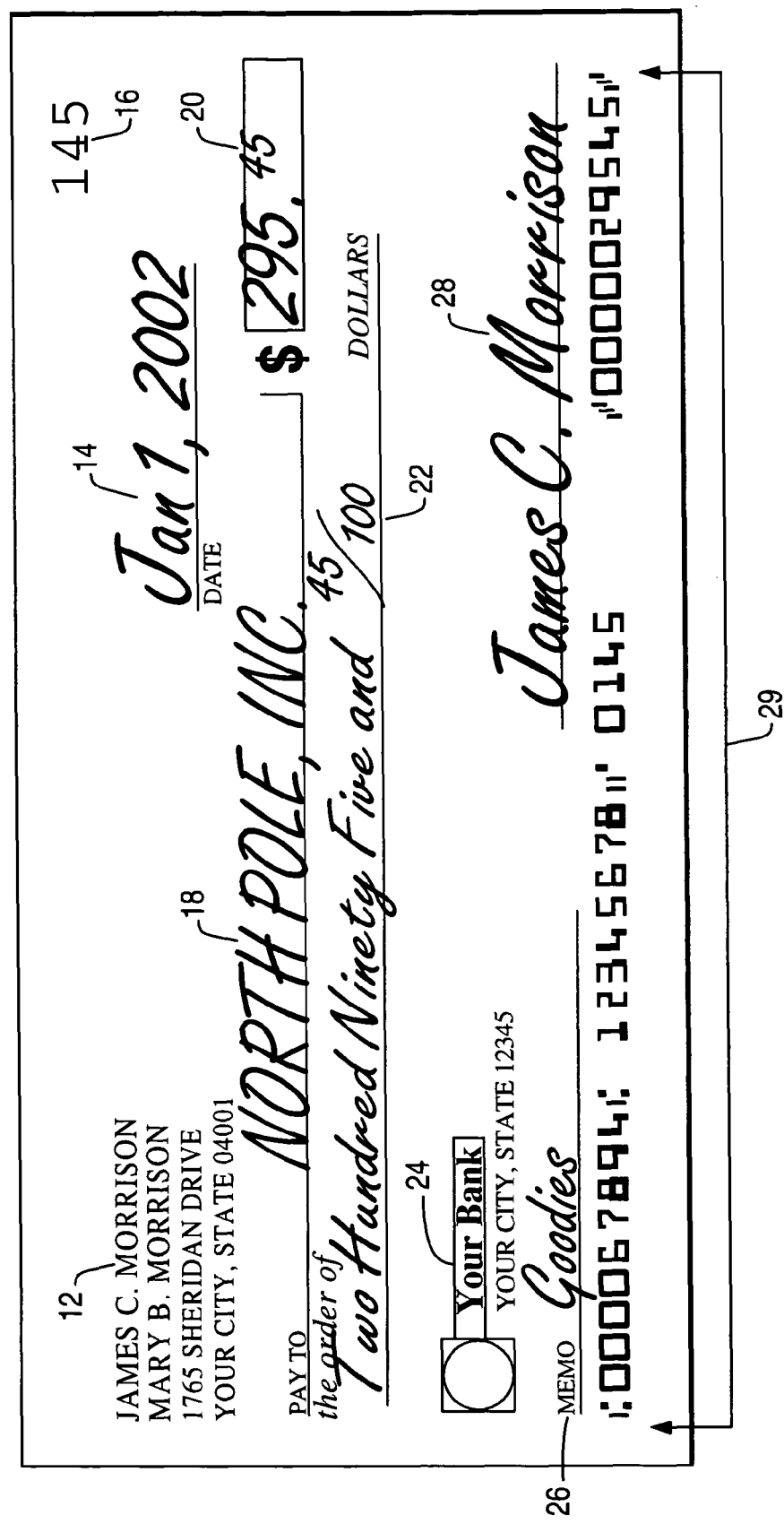
FIG. 1 is an illustration of the front side of a typical original check.

Different types of checks are processed in a check truncation environment. A physical personal check 10, as shown in FIG. 1, is one type of check which is processed. The check features shown in FIG. 1 include a payer field 12, a date field 14, a check number field 16 located in the upper-right corner of the check 10, a payee field 18, a courtesy amount field 20, a legal amount field 22, a paying bank name field 24, a memo field 26, a payer signature field 28, and a magnetic ink character recognition (MICR) codeline field 29 having characters of E13B font.

Figure 2:
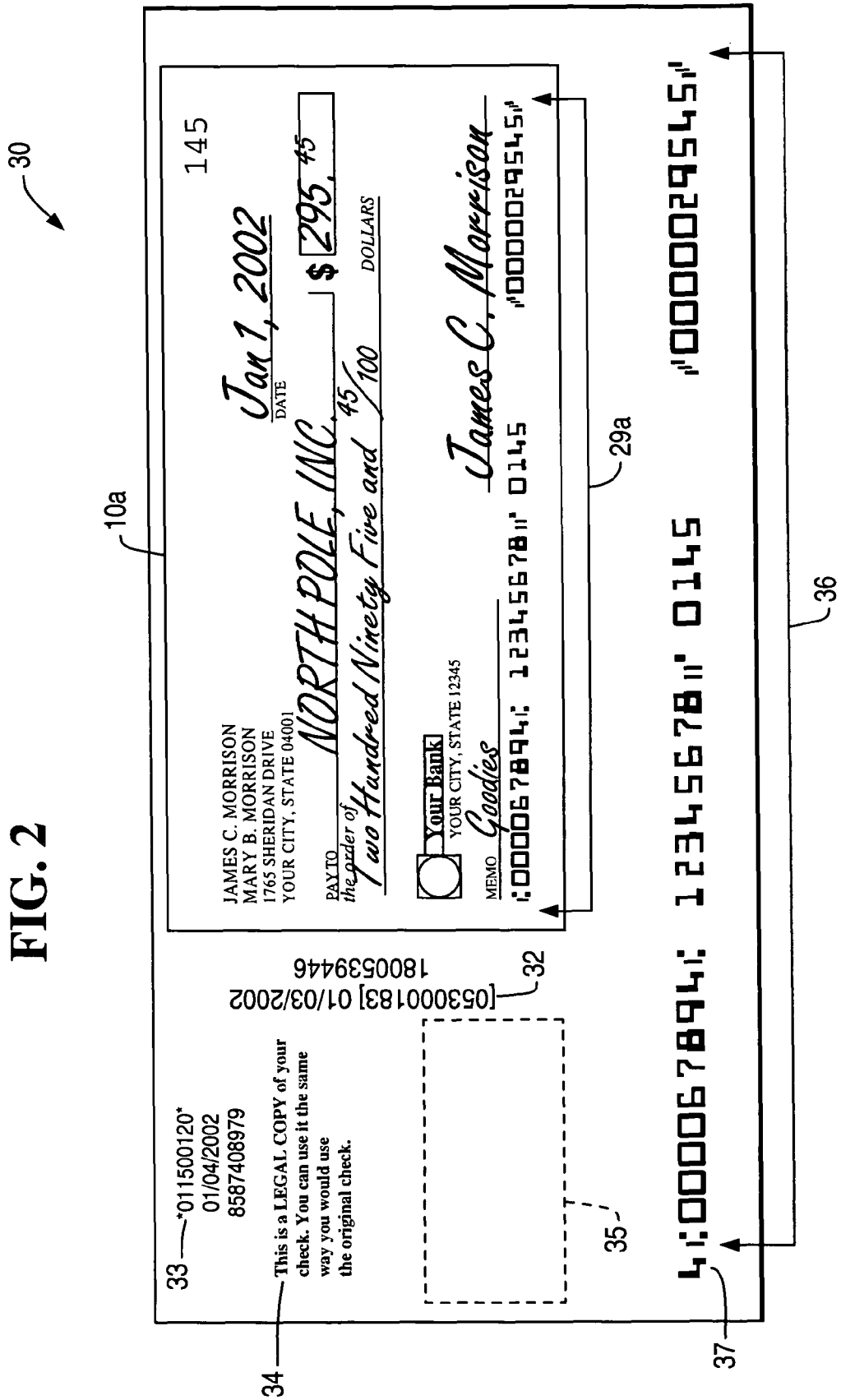
FIG. 2 is an illustration of the front side of a substitute check for the original check of FIG. 1.
Figure 3:
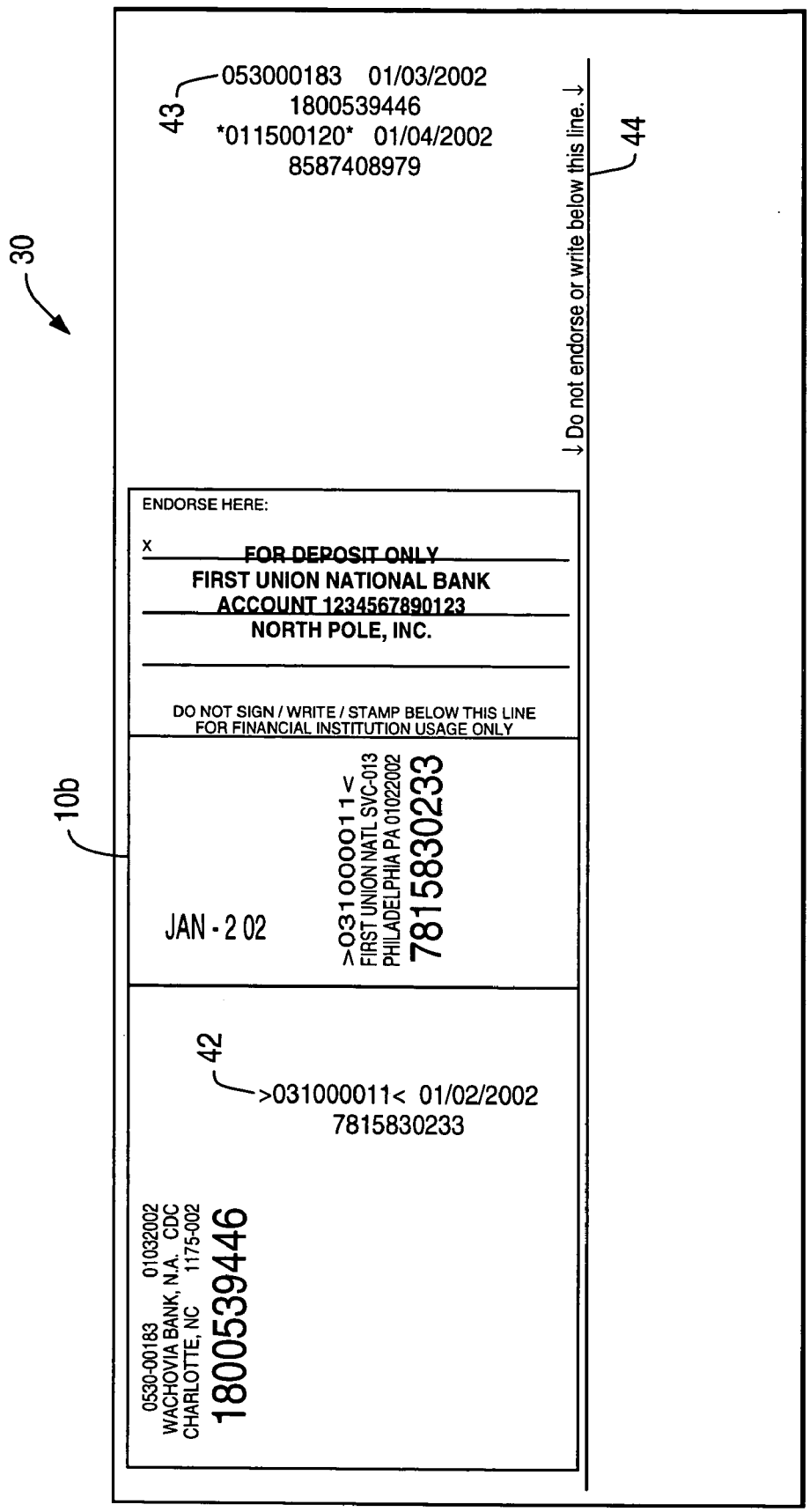
FIG. 3 is an illustration of the back side of the substitute check of FIG. 2.

Referring to FIGS. 2 and 3, the front side (FIG. 2) of an original substitute check 30 of the check 10 (FIG. 1) and the backside (FIG. 3) of the original substitute check are illustrated. The front side of the original substitute check 30 includes an original scanned front image 10a of the check 10. The front side of the original substitute check 30 also includes an endorsement 32 of the bank which captured the image of the check 10 to provide the front image 10a. The bank which captured the front image 10a of the check 10 may or may not be the bank of first deposit.

The front side of the original substitute check 30 further includes an endorsement 33 of the bank which created the original substitute check. This endorsement 33 includes three elements which are (i) the routing transit number "011500120" associated with the original substitute check 30, (ii) the date of creation of the original substitute check (i.e., "01/04/2002"), and (iii) the sequence number "8587408979" associated with the original substitute check. The two asterisks enclosing the routing transit number are used to indicate that this is the bank which created the original substitute check 30, as defined by the ANSI X9.90 standard. The front side of the original substitute check 30 also includes a text overlay 34 which identifies the original substitute check as being a legal copy of the check 10. Also included is an optional information area 35, as defined by the ANSI X9.90 standard, for placing optional information.

The front side of the original substitute check 30 also includes a MICR codeline 36 from the check 10 which has been encoded. This MICR codeline 36 is printed with ink which contains magnetic properties (referred to herein as "magnetic ink") and is the same as the MICR codeline 29a contained in the front image 10a of the check 10. Also included is substitute check identification 37 adjacent to the MICR codeline 36, in the position as shown in FIG. 2. The substitute check identification 37 is referred to as an "electronic processing code (EPC) digit" as defined by the ANSI X9.90 standard. The substitute check identification 37 is also printed with magnetic ink.

As shown in FIG. 3, the back side of the original substitute check 30 includes an original scanned back image 10b of the check 10. The back side of the original substitute check 30 also includes an initial bank of first deposit (BOFD) endorsement overlay 42. An overlay 43 of any subsequent endorsements, and a line/text overlay 44 which requests that no writings be made below the line are also included.

Figure 4:
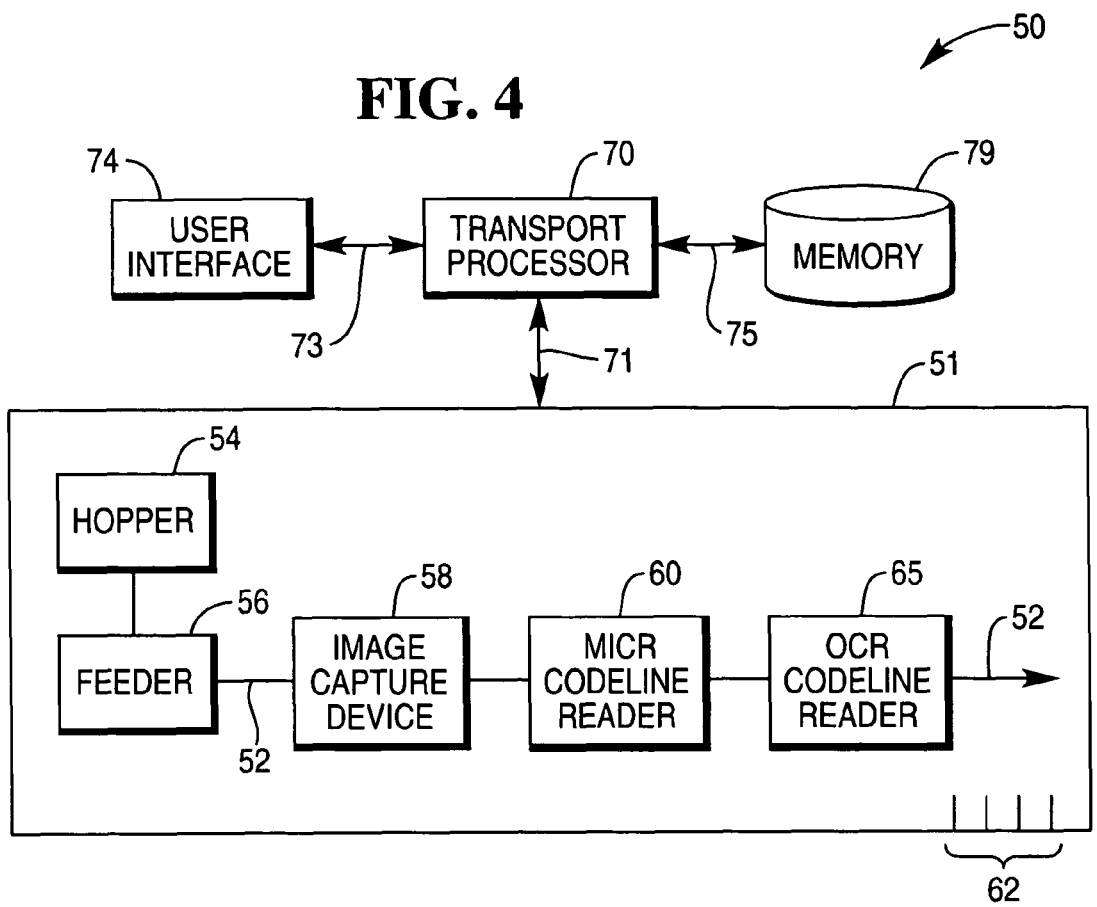
FIG. 4 is a schematic block representation of a check processing system used to process the substitute check of FIGS. 2 and 3.

Referring to FIG. 4, a check processing system 50 includes a check processing transport 51 which processes substitute checks such as the substitute check 30 described hereinabove. The specific construction and use of the check processing transport 51 may vary. The check processing transport 51 may be a dedicated unit for processing substitute checks. Alternatively, the check processing transport 51 may be, for example, a sorting machine or a proof machine wherein financial documents such as bank checks are processed in a data processing operation. In the latter case, certain hardware devices which are not used for processing substitute checks are turned off. As an example, the check processing transport 51 may comprise the Model iTRAN 8000 Item Processing System, manufactured by NCR Corporation, located in Dayton, Ohio. The certain hardware devices turned off may include image capture devices, encoders, endorsers, microfilmers, bank stampers, for examples. For simplicity, the check processing transport 51 shown in FIG. 4 will be described hereinbelow as a dedicated unit for processing substitute checks.

The check processing transport 51 has a document track which defines a document transport path 52 along which substitute checks can be transported from an upstream end to a downstream end. The transport 51 includes a number of different hardware devices lying along the document transport path 52 for performing specific document processing operations on substitute checks moving along the document transport path. The transport 51 includes a hopper 54 into which a stack of substitute checks are placed. A document feeder 56 adjacent the hopper 54 selectively feeds or drives each substitute check from the stack of substitute checks in the hopper to transport the substitute check from the upstream end to the downstream end along the document transport path 52 to sorting bins 62 (i.e., pockets) located at the end of the document transport path.

The check processing transport 51 includes an image capture device 58 located along the document transport path 52. The image capture device 58 captures an image of each substitute check moving along the document transport path 52 from the upstream end to the downstream end of the document transport path. Suitable image capture devices are readily available in the marketplace. Their structure and operation are well known and, therefore, will not be described.

The check processing transport 51 further includes a magnetic ink recognition character (MICR) codeline reader 60 located along the document transport path 52. The MICR reader 58 reads a MICR codeline from each substitute check being processed in a known manner. The check processing transport 51 also includes an optical character reader (OCR) 65 located along the document transport path 52. The OCR reader 65 optically reads the characters of a MICR codeline contained in the front check image from each substitute check being processed in a known manner. The structure and operation of MICR readers and OCR readers are well known and, therefore, will not be described.

Figure 5:
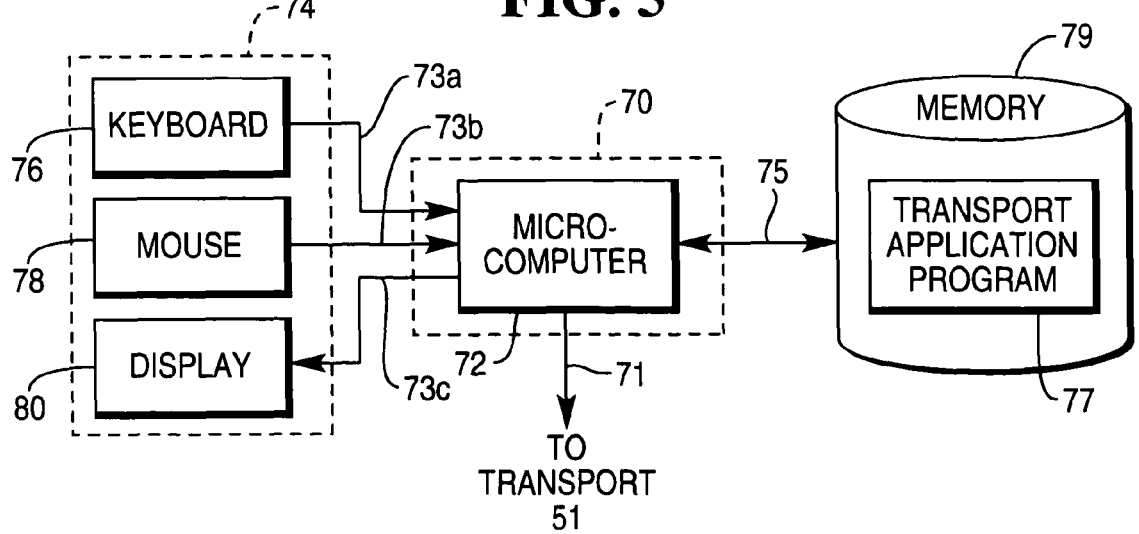
FIG. 5 is a schematic representation of a portion of FIG. 4.

Referring to FIGS. 4 and 5, the check processing system 50 further includes a transport processor 70 and a user interface 74 which communicates via signals on line 73 (FIG. 4) with the transport processor 70. The user interface 74 includes a keyboard 76, a mouse 78, and a display 80, all of which communicate via signals on lines 73a, 73b, 73c (FIG. 5) with a microcomputer 72 of the transport processor 70. A memory 79 communicates via signals on line 75 with the microcomputer 72. The memory 79 stores an executable transport application program 77 which, when executed by the microcomputer 72, controls operation of the transport 51 via signals on line 71. Suitable microcomputers and memories are readily available in the marketplace. Their structure and operation are well known and, therefore, will not be described.

Figure 6:
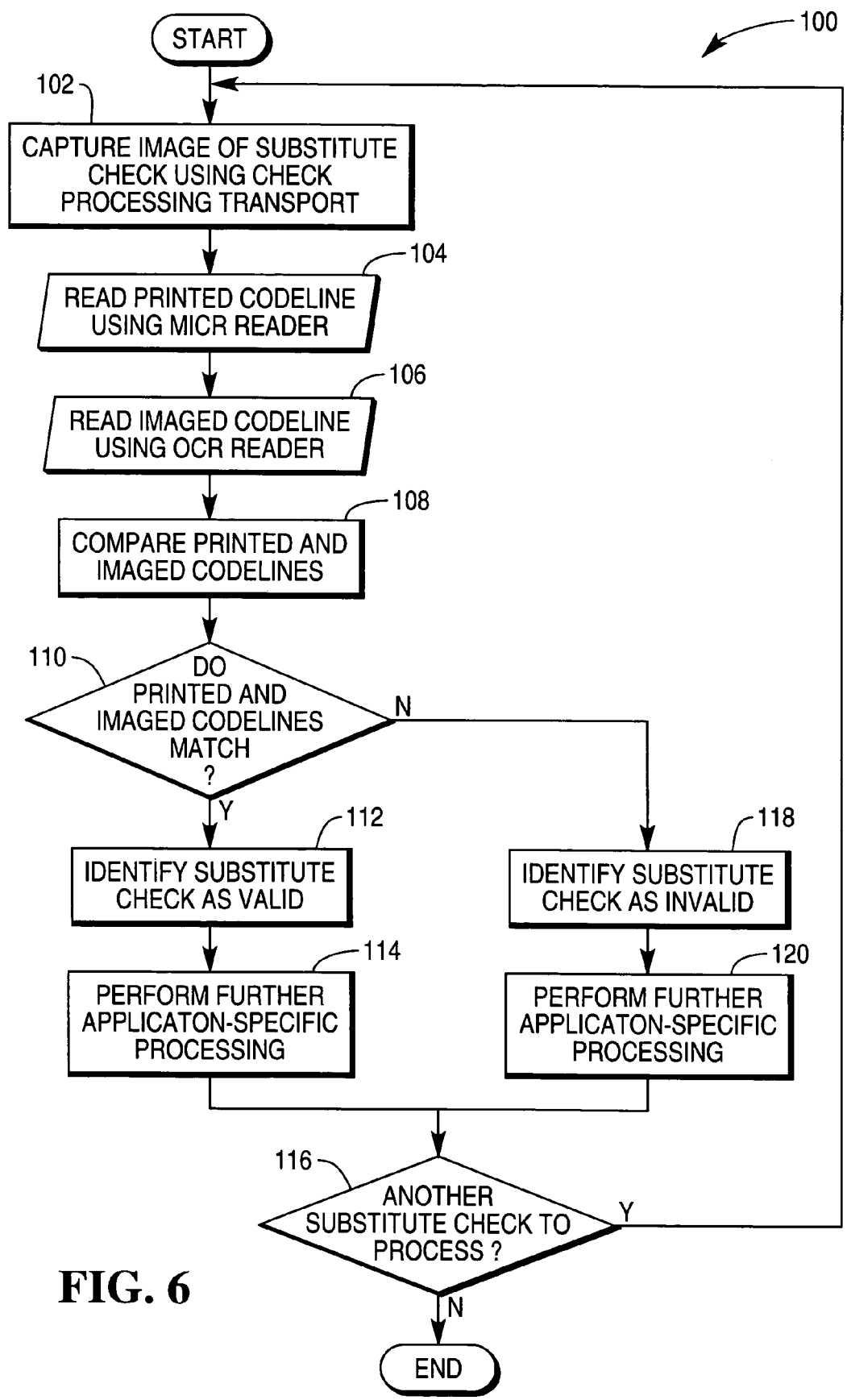
FIG. 6 is a flowchart depicting operation of a transport application program for the check processing system of FIG. 4.

Referring to FIG. 6, operation of the transport application program 77 is depicted. As shown in step 102, the image capture device 58 captures an image of a substitute check, such as the substitute check 30 shown in FIGS. 2 and 3, which is being transported along the document transport path 52. As the substitute check 30 is transported past the MICR reader 60, the MICR reader attempts to read the MICR codeline 36 (i.e., the printed codeline) of the substitute check, as shown in step 104. Then, in step 106, the OCR reader 65 attempts to read the MICR codeline 29a (i.e., the imaged codeline) which is contained in the front image 10a of the substitute check 30. The printed codeline 36 from step 104 and the imaged codeline 29a from step 106 are compared in step 108.

A determination is then made in step 110 as to whether the printed codeline 36 from step 104 and the imaged codeline 29a from step 106 match based upon the comparison which has been made in step 108. If the determination in step 110 is affirmative (i.e., there is a match), then the substitute check 30 is identified as being a valid substitute check, as shown in step 112. It should be noted that the printed codeline 36 and the imaged codeline 29a may be compared character by character (except for the EPC digit contained at the beginning of the printed codeline 36) to determine if there is a match. In this example, the EPC digit at the beginning of the printed codeline 36 is a character "4". It should also be noted that there are numerous ways to compare the printed codeline 36 and the imaged codeline 29a to determine if there is a match. For example, another way is to use fuzzy matching logic techniques to determine if there is a match. The program then proceeds to step 114 to perform further application-specific processing based upon a valid substitute check before proceeding to step 116.

However, if the determination in step 110 is negative (i.e., there is no match), then the substitute check 30 is identified as being an invalid substitute check, as shown in step 118. When the substitute check 30 identified as being an invalid substitute check, an operator may be alerted. The program then proceeds to step 120 to perform further application-specific processing based upon an invalid substitute check before proceeding to step 116.

In step 116, a determination is made as to whether there is another substitute check to be processed. If the determination in step is affirmative, the program proceeds back to step 102 to process the next substitute check to be processed. However, if the determination in step 116 is negative, the program ends.

It should be apparent that potential liabilities associated with inaccurate information between the printed codeline 36 and the imaged codeline 29a are reduced. For example, a potential liability of a bank becoming legally liable for a transfer of funds of a wrong amount may be reduced. As another example, a potential liability of a bank becoming legally liable for a transfer of funds from a wrong customer may be reduced.

Although the above description describes the printed codeline 36 and the imaged codeline 29a as having characters of E13B font, it is conceivable that characters of the codelines may be of another font.

Figure 7:
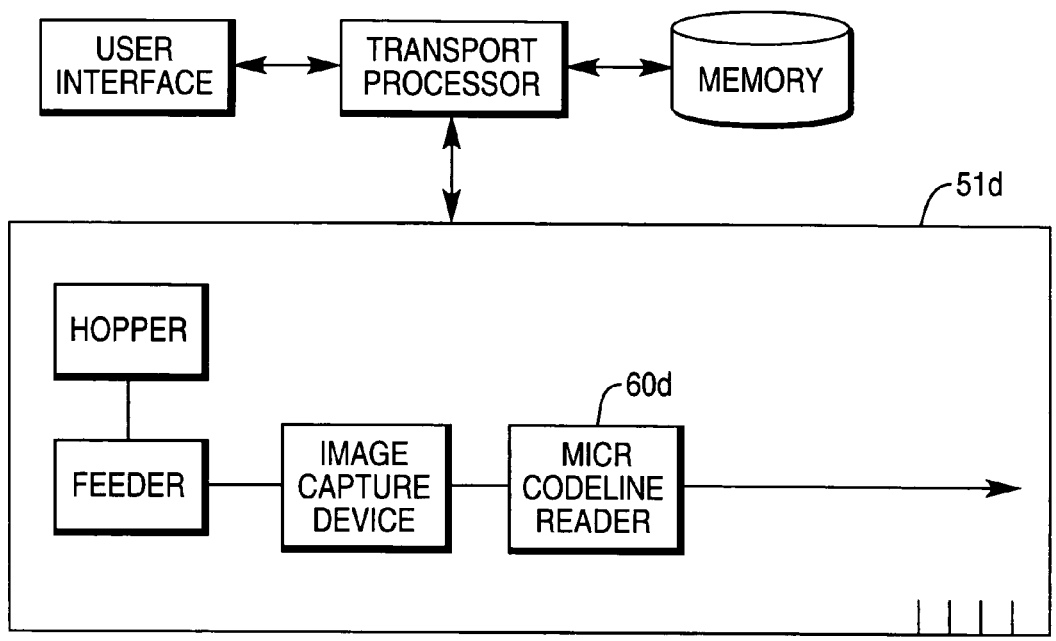
FIGS. 7-9 are similar to the schematic block representation of FIG. 4, and show other embodiments of the present invention.

Another embodiment is illustrated in FIG. 7. Since the embodiment illustrated in FIG. 7 is generally similar to the embodiment illustrated in FIG. 4, similar numerals are utilized to designate similar components, the suffix letter "d" being associated with the embodiment of FIG. 7 to avoid confusion. In the embodiment of FIG. 7, the check processing system 50d includes the check processing transport 51d which has the MICR reader 60d in hardware form and the OCR reader (not shown in FIG. 7) in software form.

Figure 8:
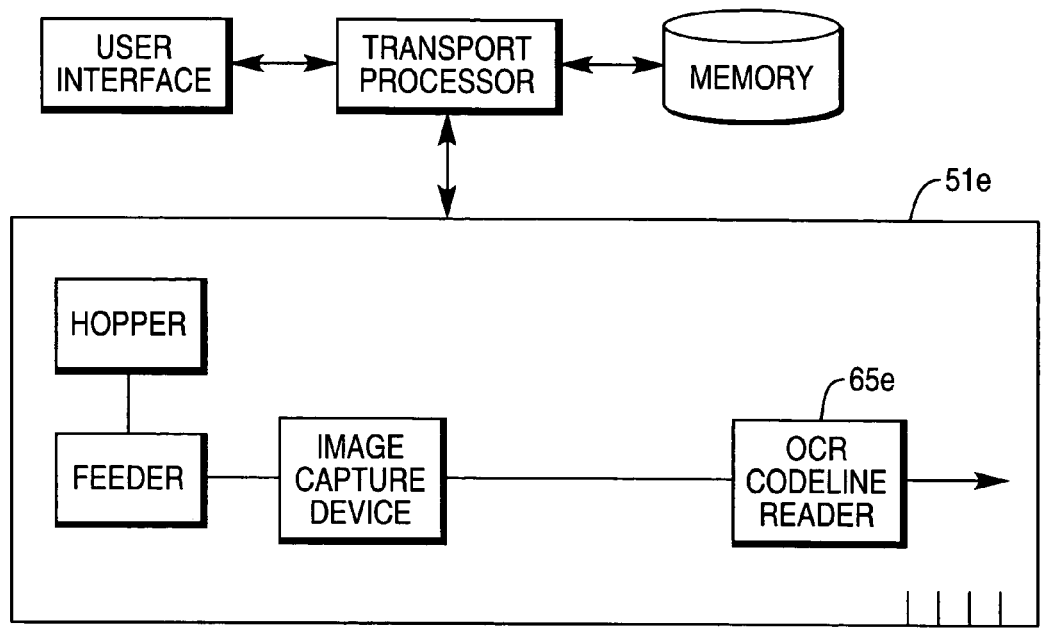

Still another embodiment is illustrated in FIG. 8. Since the embodiment illustrated in FIG. 8 is generally similar to the embodiment illustrated in FIG. 4, similar numerals are utilized to designate similar components, the suffix letter "e" being associated with the embodiment of FIG. 8 to avoid confusion. In the embodiment of FIG. 8, the check processing system 50e includes the check processing transport 51e which has the MICR reader (not shown in FIG. 8) in software form and the OCR reader 65e in hardware form.

Figure 9:
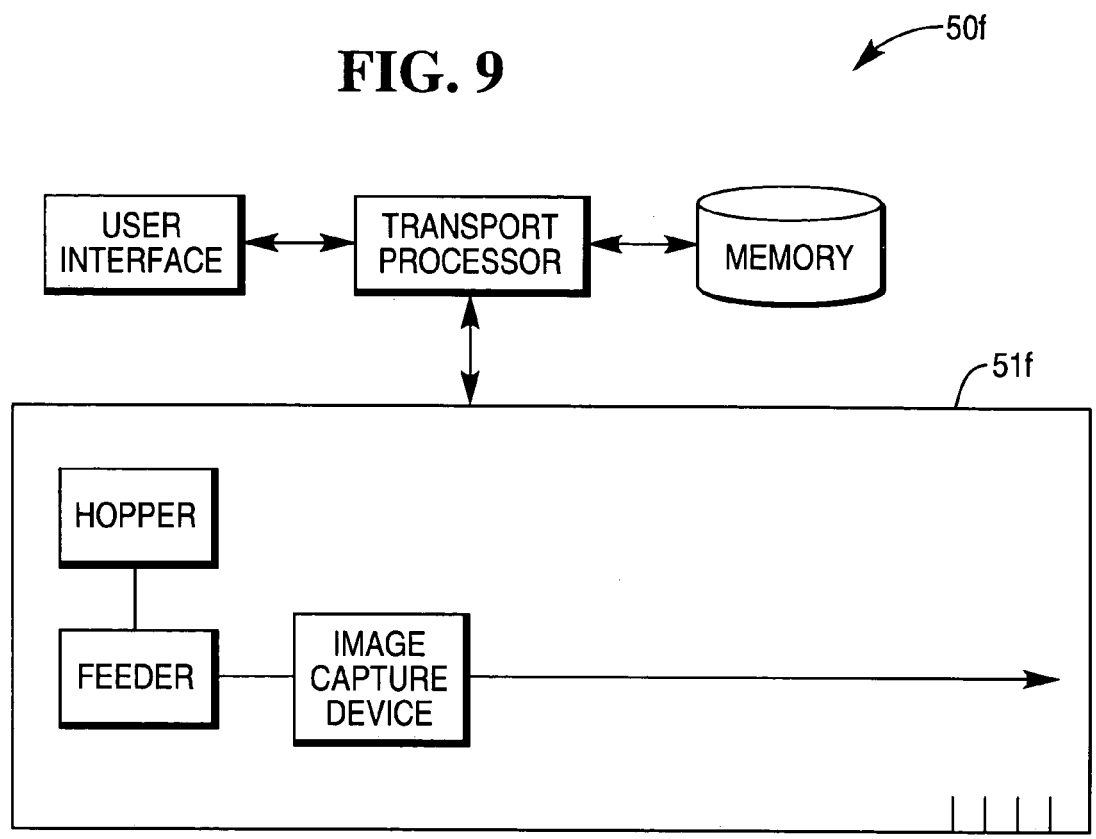

Yet another embodiment is illustrated in FIG. 9. Since the embodiment illustrated in FIG. 9 is generally similar to the embodiment illustrated in FIG. 4, similar numerals are utilized to designate similar components, the suffix letter "f" being associated with the embodiment of FIG. 9 to avoid confusion. In the embodiment of FIG. 9, the check processing system 50f includes the check processing transport 51f which has the MICR reader (not shown in FIG. 9) in software form and the OCR reader (also not shown in FIG. 9) in software form.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A computer-implemented method of processing a paper substitute check which has a first magnetic ink character recognition (MICR) codeline which is printed on a first portion of the paper substitute check and a second MICR codeline which is printed on a second portion of the paper substitute check and which second portion is different from the first portion of the paper substitute check, the computer-implemented method comprising:
    (a) electronically on an image capture device capturing an image of the paper substitute check;
    (b) reading from the paper substitute check the first MICR codeline which is printed on the first portion of the paper substitute check;
    (c) reading from the captured image of the paper substitute check the second MICR codeline which is printed on the second portion of the paper substitute check; and
    (d) electronically on a microcomputer comparing the first MICR codeline read in step (b) and the second MICR codeline read in step (c) to determine if the first MICR codeline which is printed on the first portion of the paper substitute check and the second MICR codeline which is printed on the second portion of the paper substitute check match.

2. A computer-implemented method according to claim 1, wherein the comparison of step (d) is performed electronically on a microcomputer using fuzzy matching logic.

3. A computer-implemented method of processing a paper substitute check which has a first magnetic ink character recognition (MICR) codeline which is printed on a first portion of the paper substitute check and a second MICR codeline which is printed on a second portion of the paper substitute check and which second portion is different from the first portion of the paper substitute check, the computer-implemented method comprising:
    (a) electronically on an image capture device capturing an image of the paper substitute check;
    (b) reading from the paper substitute check the first MICR codeline which is printed on the first portion of the paper substitute check;
    (c) reading from the captured image of the paper substitute check the second MICR codeline which is printed on the second portion of the paper substitute check;
    (d) electronically on a microcomputer comparing the first MICR codeline read in step (b) and the second MICR codeline read in step (c);
    (e) electronically on a microcomputer determining if the first MICR codeline which is printed on the first portion of the paper substitute check and the second MICR codeline which is printed on the second portion of the paper substitute check are acceptable based upon the comparison of step (d).

4. A computer-implemented method according to claim 3, wherein the determination of step (e) is affirmative when all characters contained in the first MICR codeline read in step (b) and all characters contained in the second MICR codeline read in step (c) match, except for an extra character contained at the beginning of the character string of the first MICR codeline read in step (b).

5. A computer-implemented method according to claim 3, wherein the comparison of step (e) is performed electronically on a microcomputer using fuzzy matching logic.

6. An apparatus comprising:
    an image capture device in hardware form for capturing an image of a paper substitute check which has been made from an original paper check;
    a first reader for reading from the paper substitute check a first magnetic ink character recognition (MICR) codeline which is printed on a first portion of the paper substitute check;
    a second reader for reading from the captured image of the paper substitute check a second MICR codeline which is printed on a second portion of the paper substitute check and which second portion is different from the first portion of the paper substitute check; and
    a microcomputer including a comparator for comparing the first MICR codeline and the second MICR codeline to determine if the first MICR codeline and the second MICR codeline match.

7. An apparatus according to claim 6, wherein the first reader includes a MICR reader in hardware form, and (ii) the second reader includes an optical character recognition (OCR) reader in hardware form.

8. An apparatus according to claim 6, wherein the first reader includes a MICR reader in hardware form, and (ii) the second reader includes an optical character recognition (OCR) reader in software form.

9. An apparatus according to claim 6, wherein the first reader includes a MICR reader in software form, and (ii) the second reader includes an optical character recognition (OCR) reader in hardware form.

10. An apparatus according to claim 6, wherein the first reader includes a MICR reader in software form, and (ii) the second reader includes an optical character recognition (OCR) reader in software form.

11. An apparatus according to claim 6, wherein the comparator includes fuzzy match logic.

* * * * *